United States Patent [19]

Gleizes

[11] 3,992,762

[45] Nov. 23, 1976

[54] APPARATUS FOR THE MOUNTING AND SHAPING OF CONTACTS ON TELEPHONIC RELAY ELEMENTS

[75] Inventor: Raymond Gleizes, Fontainebleau, France

[73] Assignee: Maison Murat, Viry-Chatillon, France

[22] Filed: Feb. 27, 1975

[21] Appl. No.: 553,844

[30] Foreign Application Priority Data

Feb. 27, 1974 France .............................. 74.06700

[52] U.S. Cl. ............................ 29/33 M; 29/630 C; 219/103
[51] Int. Cl.² .................... B23K 11/02; H01R 43/02
[58] Field of Search ............... 29/33 M, 33 Q, 33 S, 29/203 D, 203 S, 630 R, 630 B, 630 C; 219/98, 103

[56] References Cited
UNITED STATES PATENTS

| | | | |
|---|---|---|---|
| 2,784,297 | 3/1957 | Pityo ................................ | 29/630 C |
| 3,194,940 | 7/1965 | Thompson et al. .............. | 29/630 C |
| 3,229,357 | 1/1966 | Burstin ............................ | 29/630 C |
| 3,694,614 | 9/1972 | Bihler .............................. | 219/103 |

FOREIGN PATENTS OR APPLICATIONS

| | | | |
|---|---|---|---|
| 1,929,787 | 12/1970 | Germany ......................... | 219/103 |

Primary Examiner—Othell M. Simpson
Assistant Examiner—Z. R. Bilinsky
Attorney, Agent, or Firm—Haseltine, Lake & Waters

[57] ABSTRACT

Apparatus for the mounting and shaping, continuously and at high speed, of contacts on telephonic relay elements, notably blades, non-detached from a supply band, and utilizing balls adapted to be welded to elements of the band to form contacts. A container stores the balls and a distributor slide driven in alternating horizontal movement receives a plurality of balls fed from the container and feeds the balls to respective recesses formed in the upper horizontal surface of an electrode. The electrode is driven in an alternating horizontal movement between a first position for reception of the balls and a second position where it is placed under the relay band and a counter-electrode is driven vertically towards the band to effect welding of the contacts to the elements of the band. The band is driven horizontally in steps on the electrode with each step equal to the number of welded contacts and a finishing die is spaced horizontally with respect to the electrode in the direction of displacement of the band, and is provided on an upper horizontal surface with a number of shaping recesses equal to the recesses in the electrode. A counter-die shapes the contacts which have just been welded.

9 Claims, 3 Drawing Figures

APPARATUS FOR THE MOUNTING AND SHAPING OF CONTACTS ON TELEPHONIC RELAY ELEMENTS

FIELD OF THE INVENTION

The present invention relates to apparatus for mounting, by electric welding and forming continuously and at high speed, of contacts of precious metal, common or rare, and their alloys or compounds on telephonic relay elements, notably on blades non-detached from a supply band.

BACKGROUND

A first process utilized at present to mount these contacts consists of riveting them on the blades. However, such process necessitates a substantial investment due to the utilization of a costly machine and complex and expensive tools which must be maintained and utilized by qualified personnel. On the other hand, this process only permits achieving relatively low speeds of the order of 300 contacts per minute, and necessitates a significant quantity of initial material for the volume of the desired contact. Finally, when the operations of mounting the contact and of cutting the elements are assembled in the same machine, this generally being the case, they must be halted simultaneously without the possibility of one operation being carried out independently of the other.

According to a second known process, the contacts are mounted by wire welding. This process utilizes a machine which welds either a section of wire, the length of the generatrice and forms it or a wire at its extremity from a section and shapes it. In this case, the obtained contacts are not always identical. They differ in volume and can take shapes which are not suitable to achieve good electrical contact. On the other hand, the cost of the machine is relatively high if the low actual speed of production is taken into account, which is of the order of 120–150 contacts per minute. The investment is therefore substantial if it is desired to provide a mechanism for cutting the blades of the relay, for a number of machines for mounting contacts, to permit the maintenance of the level of production of this assembly (in practice, a number of contact mounting machines are provided for a single cutting press). Furthermore, it is necessary to employ a number of specialist personnel and the surface area necessary to install such machines is relatively great. The solution which has sometimes been employed and which consists of equipping one such machine with two or three supplemental heads, in fact multiplies the number of stoppages and regulations and increases the cost.

SUMMARY OF THE INVENTION

An object of the present invention is to provide an apparatus for mounting and shaping, continuously and at high speed, electrical contacts on telephonic relay elements, notably blades, non-detached from a supply band.

The apparatus according to the invention which does not have any of the above noted disadvantages, is essentially characterized in that it utilizes balls of a special type adapted to be welded on parts of the band to form the contacts and which comprises, mounted on a support frame, a container for the storage of these balls, a distribution means driven in alternating horizontal movement, and arranged such that in a first extreme position, it receives a plurality of balls fed from the container through the intermediary of a plurality of individual conduits, and which in a second extreme position feeds the said balls towards recesses capable of each receiving one ball and formed in the upper horizontal surface of an electrode, the spacing between the recesses being equal to that desired for the contacts, the electrode being also driven in an alternating horizontal movement between its position for reception of the balls, and a second position where it is disposed under the band for telephonic relays, a counter electrode driven in a vertical movement in the direction of the band and of the electrode in said second position, to effect the simultaneous welding of the contacts on the band elements, means for driving the band on the electrode in stepwise horizontal movement, with one step being equal to the number of welded contacts, a finishing die horizontally spaced with respect to the electrode in the direction of displacement of the band, and provided on its upper horizontal face with a number of shaping recesses equal to that of the recesses of the electrode, a counter-die for the simultaneous shaping of the contacts which have just been welded, a unit for cutting the relay elements from the supply band after mounting and shaping of the contacts and means for synchronizing the movements of the distribution means, the electrode, the counter electrode, the counter die and the cutting unit.

The utilized balls have a very close dimensional tolerance such that they produce contacts of the same size and weight which are reproducible and of perfect shape after shaping by the finishing die.

Advantageously, the container for the balls and the distribution means are disposed above the electrode in a manner to permit a feed by gravity of the balls from the container to the recesses through the intermediary of the conduits.

The distribution means can be constituted by a horizontal plate whose thickness is equal to the diameter of the balls and which is provided with a number of holes equal to that of the recesses in the electrode, each hole being dimensioned to receive only a single ball. Suitable support means, fixed to the frame, are provided to hold the band immobile during the alternating displacement of the electrode.

Advantageously, the displacement of the distribution means is controlled by that of the electrode. In this regard, there can be provided a drive element fixed to the electrode and which urges the plate of the distribution means in at least one direction of its alternating movement. For example, the drive element can urge the plate of the distribution means towards its position in which the holes are fed by the balls coming from the container, the plate being returned to the position in which the balls are fed from the individual conduits by means of a spring.

The above described drive means advances the band to the finishing die for the shaping of the contacts which have been welded on the blade elements. The displacement of the distribution means is synchronized with the advance of the band, the alternating movement of the electrode and the lowering and raising of the counter electrode. The counter-die, also controlled by the advancing movement of the band, is fixed to the support block of the counter electrode and descends in the same sequence with the latter, the pressure being calculated to assure the forming by the finishing die of the balls to the desired profile. The advance of the band is such as to present at the same time on the electrode and then on the finishing die, of a number of blade elements corresponding to the number of recesses in each thereof. The actual speed of the apparatus is increased. By way of example, the apparatus can weld and form 800 contacts per minute, this number not being limiting. By reason of this speed, it is possible that the balls are ejected from the recesses when the electrode arrives at the end of its travel under the counter-electrode. In this regard, according to the invention, the recesses of the electrode are perforated at their bottom by aspiration channels which in turn are connected through the intermediary of a vacuum manifold to a suction apparatus such that the balls are maintained tightly applied in the recesses during the movement of the electrode towards the counter-electrode.

When it is desired to obtain elements with contacts on each face, the band is recirculated through the apparatus but then recesses must be provided in the counter-electrode and the counter-die in order to permit the application of the latter on the upper face of the band provided with the contacts mounted through the first passage through the apparatus, without destroying the said contacts.

BRIEF DESCRIPTION OF THE DRAWING

One embodiment of the invention will next be described by way of non-limitative example with reference to the annexed drawing, in which.

DETAILED DESCRIPTION

Figure 1:
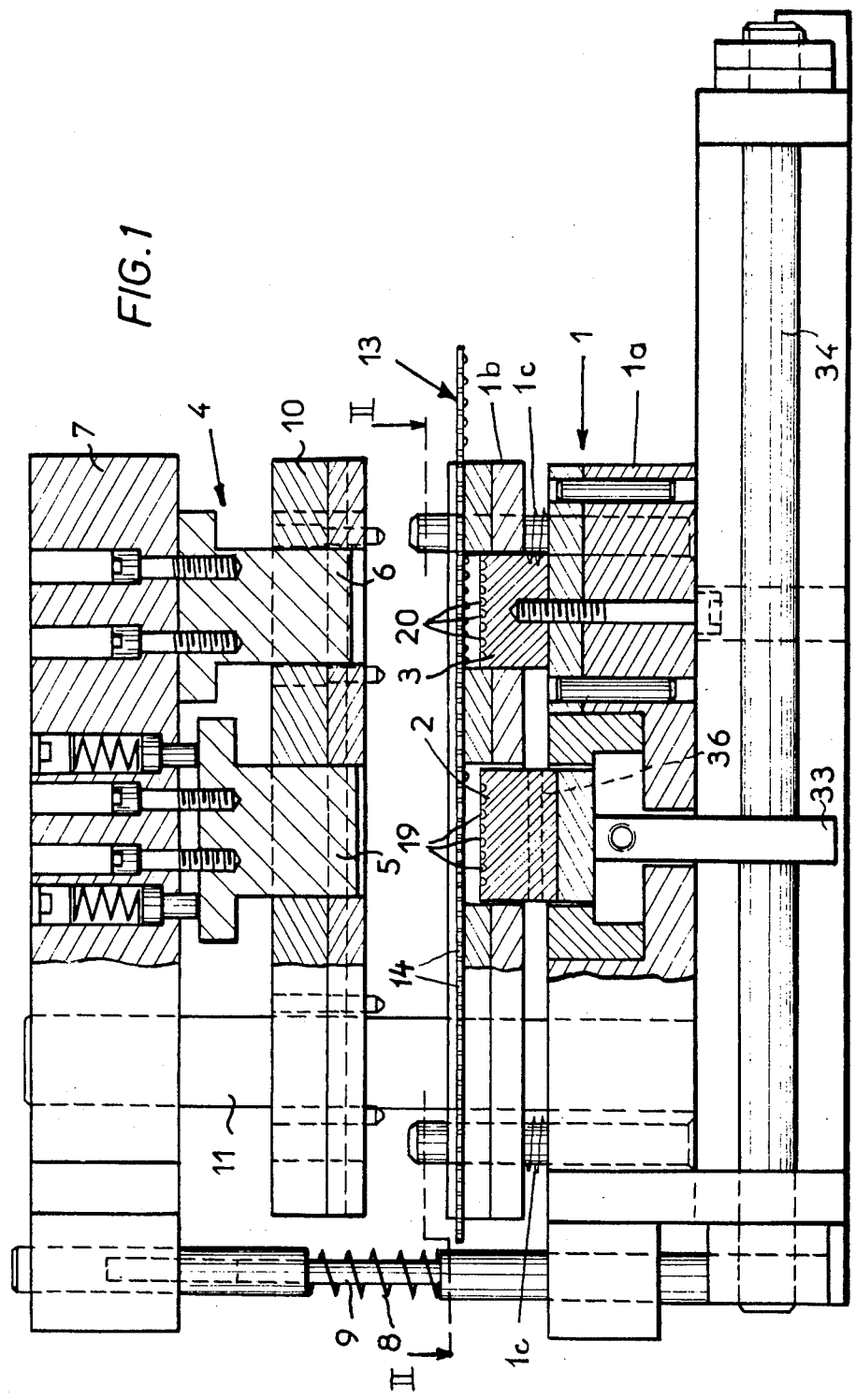
FIG. 1 is an elevational view of the apparatus according to the invention taken in the section along line I-I in FIG. 2.
Figure 2:
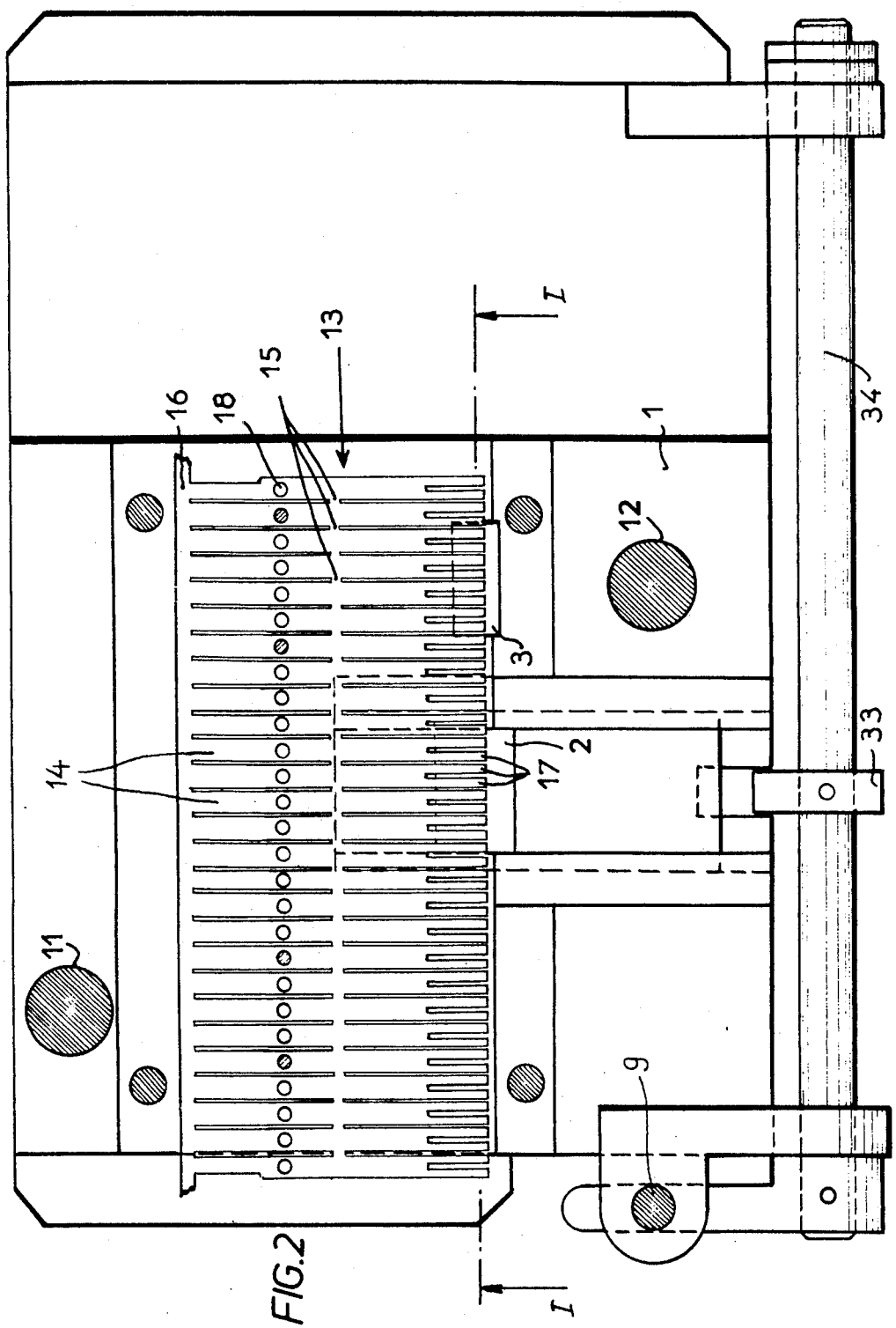
FIG. 2 is a sectional view taken on line II—II in FIG. 1.

With reference to the figures, the apparatus according to the invention is arranged on a frame which can be that of a special machine provided for this or even that of an existing press. The frame comprises on the one hand a lower body 1 in which are mounted in succession from one another, an electrode 2 and a finishing die 3, the said lower body being constituted by a fixed frame 1a and a movable counter-press 1b mounted on springs 1c, and on the other hand, an upper body 4 which is vertically movable with respect to the lower body and carries a counter-electrode 5 and a counter-die 6 respectively disposed above the electrode and the die. The upper body 4 comprises a structural element 7 slidably mounted for movement under the action of a spring 8, longitudinally along a vertical guide column 9 fixed to the lower body 1. The counter-electrode and the counter-die are slidably mounted elastically in recesses provided in a press 10 guided by two vertical columns 11, 12.

On the face of the lower frame 1, is mounted a metallic band 13 formed by a succession of telephonic relay elements such as blades 14, partially attached together through bridge sections 15, 16 adapted to be ultimately divided. Each blade comprises at one extremity two tongues 17 on which it is intended to weld the contacts. The band is driven stepwise on the surface of the body of frame 1 by means of drive means (not shown) engaged in pilot holes 18 in such manner that the blades are presented first on the electrode 2, then on the die 3.

As clearly shown in FIG. 1, the electrode 2 is provided on its upper face with a plurality of recesses 19 (eight in number in FIG. 1) arranged in pairs corresponding to the tongues 17 on the band 13. The spacing between recesses is as desired. Furthermore, the finishing die 3 is provided on its upper face with recesses 20, eight in number in the case of FIG. 1, and having the same disposition as the recesses on the electrode.

The recesses 19 are adapted for each receiving a ball intended to form a contact. The balls 21 are constituted of precious metal, rare or common, and their alloys and compounds. They should be of special type having very strict dimensional tolerances. These qualities are indispensable to a good feed while permitting further the obtention of contacts of constant weight and size which are reproducible and of perfect form after shaping by the die. The balls project above the recesses in such manner that the tongues of the band are not in contact with the electrode but rest on the balls.

Figure 3:
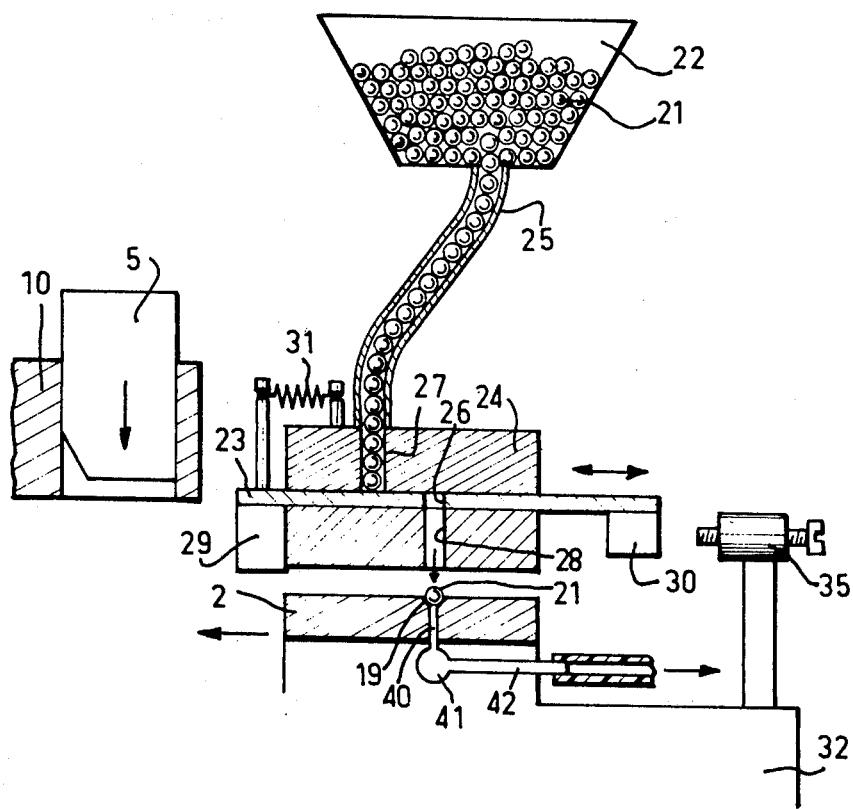
FIG. 3 is a side view showing a distribution system for the balls.

According to the invention, the recesses 19 are provided with balls from a distribution system illustrated in FIG. 3 comprising on the one hand, a container 20 having any form suitable for a good feed of the balls, and capable of being vibrated or receiving a means for stirring the balls or any other equivalent means and, on the other hand, a distributor slide 23 driven in alternating horizontal movement at the interior of a body 24 for the slide.

The slide is a conventional type. It is constituted by a perforated plate having a number of holes 26 equal to that of the recesses of the electrode. The thickness of the plate and the size of the holes are selected so that each hole can receive only a single ball. The body 24 of the slide has eight upper orifices 27 connected to the container through the intermediary of eight individual conduits 25 of which one is visible in FIG. 3 and eight lower orifices 28 spaced with respect to the upper orifices 27. The container 22 is mounted at a level above the distributor which is itself mounted at a level above the electrode, and the orifices 27 and 28 are vertically oriented in such manner that the balls can travel by gravity from the container 22 to the recesses. The conduits can be rigid, flexible or semi-rigid and their diameter is a function of that of the ball.

The slide distributor is provided with two abutments 29, 30 which limit its sliding movement with respect to the support between a first position in which the holes 26 are in registry with the orifices 27, and a second position in which they are in registry with the orifices 28. The distributor slide is urged towards its second position by a spring 31 bearing on the support and on the slide.

The electrode 2 is carried by a support 32 and is driven in an alternating movement in a horizontal plane between a first position in which the recesses are disposed under the counter-electrode 5, and a second position in which they are disposed under the extremities of the orifices 28. This movement is obtained by means of a cam 33 secured on a rotatable shaft 34 driven by a motor means (not shown). An adjustable abutment 35 carried on a column fixed to the support 32 is capable, when the electrode is displaced towards its first position, of driving the slide to the left in the case of FIG. 3 against the force of the spring 31, until the abutment 30 makes contact with the body 24 of the distributor.

By reason of the high speed of travel of the electrode, this, each time that it arrives at the end of travel, is subjected to an impact which runs the risk of ejecting the balls from the recesses. In order to remedy this, there is provided according to the invention, aspiration means which holds the balls in the recesses. In one particular embodiment illustrated in FIG. 3, the recesses 19 of the electrode 2 are perforated at their bottom by aspiration channels 40 connected through the intermediary of a suction manifold 41 and a passage 42 formed in the electrode to a suction means for air, (not shown).

In operation, the electrode is initially disposed under the counter-electrode 5 and as a consequence, the abutment 35 displaces the slide towards the left in FIG. 3. Eight balls 21 can thus be placed in the holes 26. The electrode 2 is then driven to the position in FIG. 3. The adjustable abutment 35 moves back accordingly, thereby liberating the slide which is urged to the right by the spring 31. At the instant when the abutment 29 is in contact with the body 24 of the distributor, the holes 26 are disposed exactly above the lower orifices 28, the eight balls 21 then fall by gravity into the recesses 19 of the electrode and are maintained there in place by suction through the channels 40. The electrode is then returned towards its initial position while at the same time the slide is driven by the abutment 35 to the left. The slide could also be driven to the left by the spring and to the right by the abutment 35, then fixed to the abutment 30 without changing the principle of the invention.

When the electrode is in the welding position, the tongues 17 of the blades are exposed above the balls. The upper body 4 descends with the necessary force corresponding to the required pressure for the welding and the shaping. The band 13 is then immobilized between the press 10 and the counter-press 1b, which is then driven against the action of the springs 1c until the balls come into contact with the elements to which they are to be welded. The passage of current between the electrode and the counter-electrode is effected through the intermediary of the small zones of contact between the balls and the tongues. The electrode is cooled by a refrigerant circulating in a tube 36 which traverses the electrode. The counter-electrode is raised when the welding has been effected, the return springs 1c of the counter-press 1b permitting the advance of the driven band so that the welded balls are placed above the recesses of the finishing die. During this time, the distributor feeds eight balls adapted to form eight following contacts on the band.

The counter-die 6, controlled by the movement of advance of the band, is fixed to the body 4 carrying the counter-electrode, and descends in synchronization with the latter, the pressure being calculated to assure the shaping by the die 6 of the welded balls to the desired shape, the band being newly immobilized between the press 10 and the counter-press 1b. The same movement of disengagement of the band is assured by the springs 1c. Finally, the band is advanced to a cutting unit (not shown) which divides the sections 15, 16 connecting the elements 14. Synchronized with the advance of the band is the displacement of the slide, the alternating movement of the electrode, and the vertical movements of the counter-electrode and the counter-die.

There can be advantageously associated with the apparatus which has just been described a device or control of the resistance to squeezing of the contacts. The apparatus described has a speed of 800 welded and shaped contacts per minute for 100 steps per minute of advance of the band.

It it is desired to form contacts on the other face of the blades 17 of the band, it is sufficient to turn the band over and to reintroduce it into the apparatus. However, in this case, the counter-electrode 5 and the counter-die 6 must be provided with recesses of sufficient size to receive the contacts formed during the first passage through the apparatus.

The apparatus according to the invention has as an additional advantage, the fact that the assembly of the mechanical parts need not be changed if the strucutral characteristics of the contacts or of the blades are modified. It is sufficient to change the electrode, the die, the distributor feed, the conduits and apparatus for advance and guiding, without touching the frame of the machine or the supports of the different parts of the apparatus. On the other hand, the provision of a slide distributor and of individual conduits permits demounting of the container for the balls with respect to the welding and shaping apparatus.

I claim:
1. Apparatus for mounting and shaping, continuously and at high speed, contacts on non-detached telephonic relay elements on a metal supply strip, said contacts being balls adapted to be welded on the elements of said supply strip to form contacts thereon, said apparatus comprising:
   a support frame on which a metal strip with telephonic relay elements can be supported,
   a container for storage of balls adapted to form contacts, said container being provided, at its bottom, with an outlet aperture through which a predetermined number of balls may be fed simultaneously,
   a movable distributor slide provided with a number of holes equal to said predetermined number and each of which is sized to receive a single ball, said distributor slide being movable in alternating horizontal movement between a first extreme position wherein each hole receives a ball from said outlet aperture, and a second extreme position,
   a fixed distributor support provided with a number of passages equal to said predetermined number and sized to permit a single ball to pass therethrough.
   an electrode provided with an upper horizontal surface on which are formed a number of hemispherical recesses equal to said predetermined number, each recess being sized to receive therein substantially one half of a ball, said electrode being movable in alternating movable movement between a first position and a second position,
   conduits connected at one end thereof to said passages of the distributor support respectively and having other ends which open above said electrode, the latter being movable in alternating horizontal movememt between said first position in which said recesses are located under said other ends of the conduits such that each receives a ball, and said second position wherein the recesses carrying the balls lie under the telephonic relay strip,
   a counter-electrode driven in alternating vertical movement towards and away from the electrode in its second position.
   the strip being advanced horizontally in steps on the electrode, each step being equal to the number of contacts to be welded simultaneously,
   a finishing die spaced horidzontally with respect to the electrode in the direction of displacement of the strip, said finishing die being provided with an upper horizontal surface on which are formed a number of hemispherical recesses equal to said predetermined number, and a counter-die driven in an alternating vertical movement toward and away from the finishing die, said relay elements being cut from the supply strip after the mounting and the shaping of the contacts.

2. Apparatus according to claim 1 wherein the container is disposed above the electrode so as to permit a gravity feed of the balls from the container to the recesses of the slide.

3. Apparatus according to claim 1 comprising aspiration means for maintaining the balls in the recesses of the electrode.

4. Apparatus according to claim 1 wherein the recesses in the electrode are perforated at their bottoms by aspiration channels and a vacuum manifold connected to said channels for aspiration of air such that the balls are maintained firmly applied in the recesses during the movement of the electrode towards the counter-electrode.

5. Apparatus according to claim 1 comprising support means fixed to the frame to maintain said band immobile during the alternating displacement of the electrode.

6. Apparatus according to claim 1 comprising a counter-press vertically movable and resiliently mounted to return the counter-press to a raised position at a level higher than that of the recesses in the electrode and in the die, said electrode and die being slidably mounted in said counter press, and a main press driven in vertical movement and supporting the counter-electrode and the counter-die.

7. Apparatus according to claim 1 wherein the displacement of the slide is controlled by that of the electrode.

8. Apparatus according to claim 7 comprising a drive element fixed to said electrode to urge the slide in at least one direction of its alternating movement.

9. Apparatus according to claim 1 wherein said counter-die is secured with the counter-electrode to descend at the same speed therewith.

* * * * *